United States Patent
Lalane et al.

(10) Patent No.: US 7,946,385 B2
(45) Date of Patent: May 24, 2011

(54) PROCESS FOR THE PRODUCTION OF AN ACOUSTICALLY RESISTIVE STRUCTURE, THE ACOUSTICALLY RESISTIVE STRUCTURE THUS OBTAINED, AND COATING USING SUCH A STRUCTURE

(75) Inventors: Jacques Lalane, Saint Orens de Gameville (FR); Christophe Menier, Saint Jean de Boiseau (FR); Jean-Christophe Bossis, Montbert (FR); Jean-Marc Poignonec, Cordemais (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 12/594,657

(22) PCT Filed: Mar. 28, 2008

(86) PCT No.: PCT/FR2008/050561
§ 371 (c)(1),
(2), (4) Date: Oct. 5, 2009

(87) PCT Pub. No.: WO2008/135702
PCT Pub. Date: Nov. 13, 2008

(65) Prior Publication Data
US 2010/0126798 A1  May 27, 2010

(30) Foreign Application Priority Data
Apr. 4, 2007  (FR) ..................... 07 54275

(51) Int. Cl.
*G10K 11/16* (2006.01)
(52) U.S. Cl. .......................... 181/296; 181/290; 244/1 N
(58) Field of Classification Search .................. 181/296, 181/290; 244/1 N
See application file for complete search history.

(56) References Cited

U.S. PATENT DOCUMENTS

| 3,329,740 A | | 7/1967 | Battersby |
| 4,687,053 A | | 8/1987 | Paulus et al. |
| 5,604,010 A | * | 2/1997 | Hartz et al. ................... 428/118 |
| 5,747,573 A | | 5/1998 | Ryan |
| 6,190,602 B1 | * | 2/2001 | Blaney et al. ................ 264/443 |
| 6,615,950 B2 | * | 9/2003 | Porte et al. .................... 181/292 |

(Continued)

FOREIGN PATENT DOCUMENTS

DE   20 2004 018 241   4/2006

(Continued)

OTHER PUBLICATIONS

International Search Report dated Nov. 11, 2008, from corresponding PCT application.

*Primary Examiner* — Elvin Enad
*Assistant Examiner* — Forrest M Phillips
(74) *Attorney, Agent, or Firm* — Young & Thompson

(57) ABSTRACT

A process for the production of an acoustically resistive structure that can be inserted in an alveolar structure so as to obtain a coating for the acoustic treatment, whereby the acoustically resistive structure includes at least one porous layer (34) and at least one reinforcement structure (36) assembled by gluing, the process including:
  applying an amorphous-type adhesive on the at least one reinforcement structure (36),
  perforating or micro-perforating the reinforcement structure (36) after the application of the amorphous-type adhesive, and
  applying the at least one porous layer against the face of the reinforcement structure (36) that is coated with amorphous-type adhesive.

13 Claims, 4 Drawing Sheets

U.S. PATENT DOCUMENTS

Figure 1:
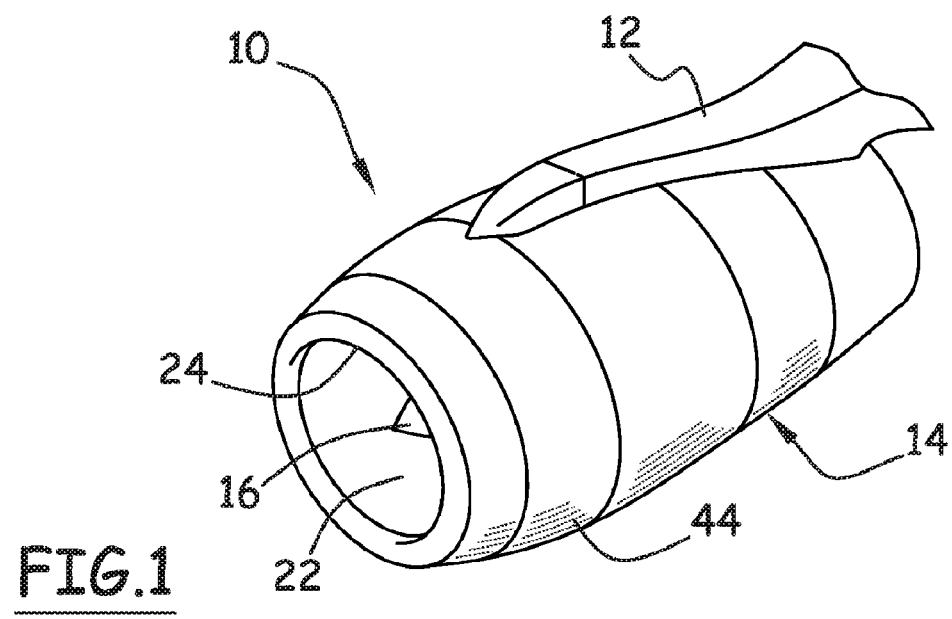

| | | | |
|---|---|---|---|
| 7,257,894 B2 * | 8/2007 | Buge et al. | 29/890.01 |
| 7,484,593 B2 * | 2/2009 | Braun et al. | 181/292 |
| 7,540,354 B2 * | 6/2009 | Morin et al. | 181/292 |
| 2003/0021976 A1 | 1/2003 | Dublineau et al. | |
| 2008/0083497 A1 | 4/2008 | Dublineau et al. | |

FOREIGN PATENT DOCUMENTS

| | | | |
|---|---|---|---|
| EP | 0 911 803 | | 4/1999 |
| EP | 1 764 399 | | 3/2007 |
| FR | 2 826 168 | | 12/2002 |
| JP | 2005055466 | A * | 3/2005 |

* cited by examiner

PROCESS FOR THE PRODUCTION OF AN ACOUSTICALLY RESISTIVE STRUCTURE, THE ACOUSTICALLY RESISTIVE STRUCTURE THUS OBTAINED, AND COATING USING SUCH A STRUCTURE

This invention relates to a process for the production of an acoustically resistive structure that, combined with other layers, makes it possible to obtain a coating for the acoustic treatment that is more particularly designed to be added to the surfaces of a nacelle of an aircraft so as to reduce a portion of the noise that is emitted by the turboreactor that is arranged in said nacelle.

BACKGROUND OF THE INVENTION

An aircraft propulsion system comprises a nacelle in which a power plant that drives a fan that is mounted on its shaft is arranged in an essentially concentric manner.

The nacelle comprises an inside wall that delimits a pipe with an air intake at the front, whereby a first portion of the incoming air flow, called primary flow, passes through the power plant to participate in the combustion, and whereby the second portion of the air flow, called secondary flow, is driven by the fan and flows into an annular pipe that is delimited by the inside wall of the nacelle and the outside wall of the power plant.

The noise that is emitted by the propulsion system consists of, on the one hand, jet noise, produced outside of the pipes following the mixing of different flows of air and exhaust gases, and, on the other hand, noise that is generated by the inside portions, called internal noise, produced by the fan, the compressors, the turbines and the combustion that propagates inside the pipes.

To limit the impact of noise pollution close to airports, the international standards are increasingly restrictive in terms of sound emissions.

Techniques have been developed to reduce the internal noise, in particular by using, at the walls of pipes, coatings whose purpose is to absorb a portion of the sound energy, in particular by using the principle of Helmholtz resonators. In a known manner, this acoustic coating, also called acoustic panel, comprises—from the outside to the inside—an acoustically resistive structure, an alveolar structure, and a reflective layer.

Layer is defined as one or more layers that may or may not be of the same nature.

The acoustically resistive structure is a porous structure that has a dissipative role, partially transforming the acoustic energy of the sound wave that passes through it into heat. It comprises so-called open zones that can allow acoustic waves to pass and other so-called closed or filled zones that do not allow sound waves to pass but are designed to ensure the mechanical strength of said layer. This acoustically resistive layer is characterized in particular by an open surface ratio that varies essentially based on the engine and components that constitute said layer.

Generally, the acoustically resistive structure comprises at least one porous layer and at least one reinforcement structure.

The porous layer is to make it possible to make the acoustic treatment linear and to trap the acoustic waves in the Helmholtz cells that are formed by the alveolar structure.

According to one embodiment, the porous layer is a metal material, in particular a stainless steel mesh that is known to one skilled in the art.

The advantage of this type of material is that it has a significant mechanical strength even for very small thicknesses, on the order of 1 to 2 tenths of a millimeter, greater than that of a synthetic material.

This significant mechanical strength is necessary because this material that is placed on the surface in direct contact with the aerodynamic flows can be eroded by solid particles such as grains of sand and small rocks, or it can be impacted by pieces of ice or birds that may be sucked in that, with speed, can cause degradations.

According to another advantage, this metal material is an excellent conductor for the swept stroke.

The reinforcement structure comes in the form of a composite or metal plate in which orifices with a more or less large cross-section are made. According to one embodiment, the reinforcement structure comes in the form of a panel with oblong and round perforations. As a variant, the panel could comprise micro-perforations with diameters on the order of 0.05 to 1.2 mm.

A metal reinforcement structure and a metal damping material are preferred because they make it possible to obtain a necessary high mechanical strength, in particular when the acoustically resistive structure is inserted in heavily stressed zones, such as a leading edge of an air intake of a nacelle.

In addition, these metal elements ensure an excellent heat diffusion that improves the effectiveness of the frost treatment that is necessary at the air intake of a nacelle.

To assemble the porous layer and the reinforcement structure, the bonding that makes it possible to obtain a smooth surface, and therefore better aerodynamics, and to not increase the on-board weight too much, unlike other attachment means such as rivets, screws, etc., is used. In addition, the bonding makes it possible to assemble various materials, elements of different thicknesses, and to obtain a better distribution of constraints.

According to one embodiment, thermostable thermoplastic resins are used, such as that of the families of polyetherimides (PEI), polyether ether ketones (PEEK), polyphenylenesulfones (PPS), polyamides (PA), and the polyethylene terephthalate (PET), making it possible to obtain behaviors with prolonged exposures to temperatures of between 300° C. and 400° C.

The patent applications FR-2,826,168 in the name of the applicant describe processes for the production of an acoustically resistive layer.

Prior to the assembly of the elements, the reinforcement structure is perforated or micro-perforated, and then cleaned and prepared so that the adhesive adheres correctly to said reinforcement structure.

Next, an adhesive film of constant thickness, non-adhesive under cold conditions, is arranged between the reinforcement structure that is prepared and the porous layer. The film is preferably cut out along the open zones of the reinforcement structure so as not to glue said zones and to block, facing the open zones, the material meshes used as a porous layer.

According to the requirements, these elements can optionally be shaped or folded.

Next, the different elements are heated so as to activate the adhesive and pressed. After cooling, a strong assembly of the reinforcement structure and the porous layer is obtained. This assembly is all the stronger since the adhesive has a constant and minimal thickness over the entire surface of the reinforcement structure.

Despite all of the care provided during the production of the acoustic damping structure, the result is not optimal for the following reasons:

The two elements to be assembled no longer being planar, the thicknesses of the adhesive can vary by several 100ths to 1 mm, which is reflected by a non-homogeneous nature of the connection between the reinforcement structure and the porous layer, increasing the risk of a significant delamination.

Furthermore, the excess adhesive has a tendency to flow toward the zones that are perforated or micro-perforated on the porous layer, which obstructs the material meshes used as a porous layer and considerably reduces the effectiveness of the acoustic treatment.

Finally, cutting the adhesive film and its positioning relative to the reinforcement structure so as to make the open zones of said film and said reinforcement structure cooperate are all the more difficult to implement since the shape of the elements to be assembled is complex.

Also, the purpose of this invention is to overcome the drawbacks of the prior art by proposing a process for the production of an acoustically resistive structure that makes it possible to improve the adhesion between the elements of said structure and not to alter the acoustic damping characteristics of said structure.

SUMMARY OF THE INVENTION

For this purpose, the invention has as its object a process for the production of an acoustically resistive structure that can be inserted in an alveolar structure so as to obtain a coating for the acoustic treatment, whereby said acoustically resistive structure comprises at least one porous layer and at least one reinforcement structure assembled by gluing, characterized in that it consists in applying an amorphous-type adhesive on said at least one reinforcement structure, perforating or micro-perforating the reinforcement structure after the application of the amorphous-type adhesive, and applying said at least one porous layer against the face of the reinforcement structure that is coated with amorphous-type adhesive.

The amorphous nature of the adhesive allows a series of temperature increases and cooling periods that do not alter the characteristics of this adhesive, which makes possible a step-by-step assembly, limits the risks of blocking the meshes of the porous layer to the right of the open zones of the reinforcement structure, and ensures a constant and optimal thickness of the adhesive.

BREIF DESCRIPTION OF THE DRAWINGS

Figure 2:
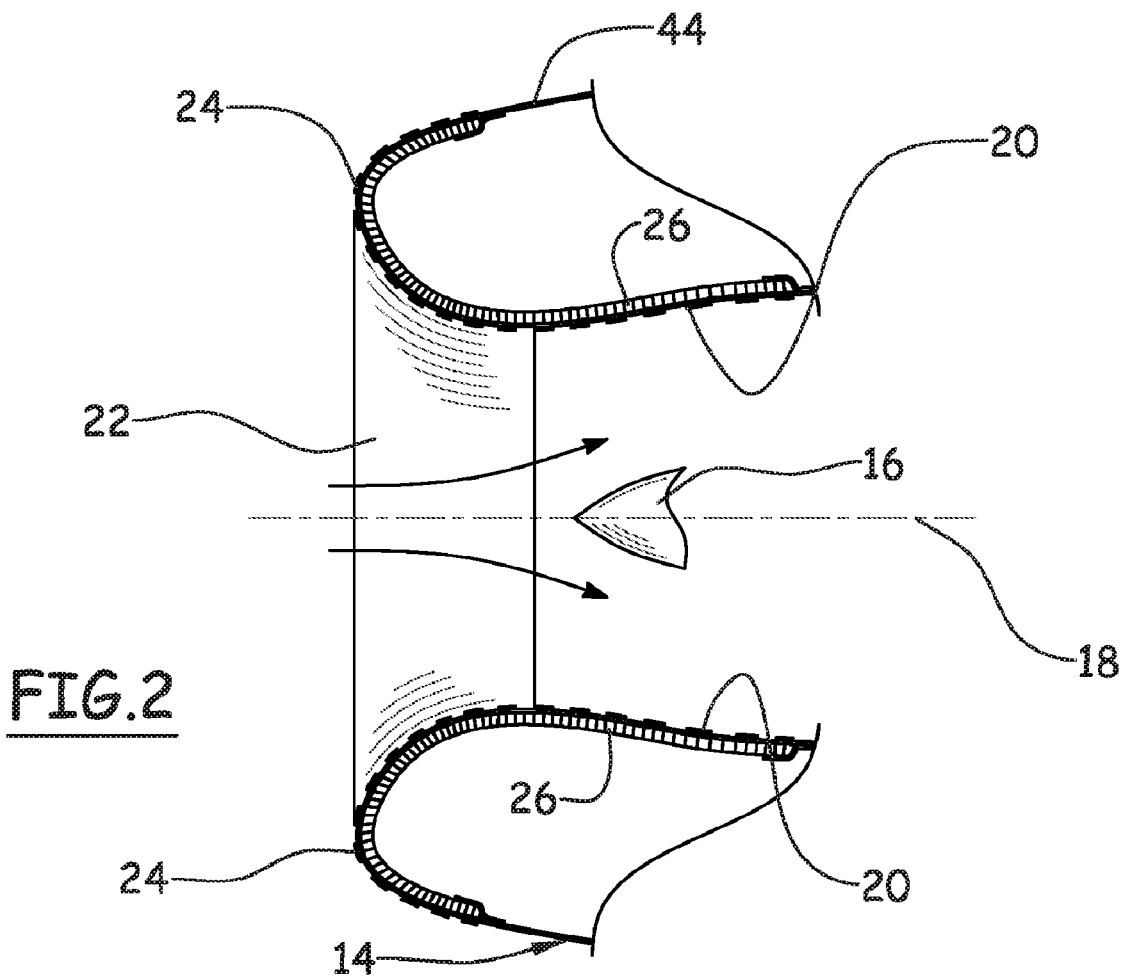
Figure 3:
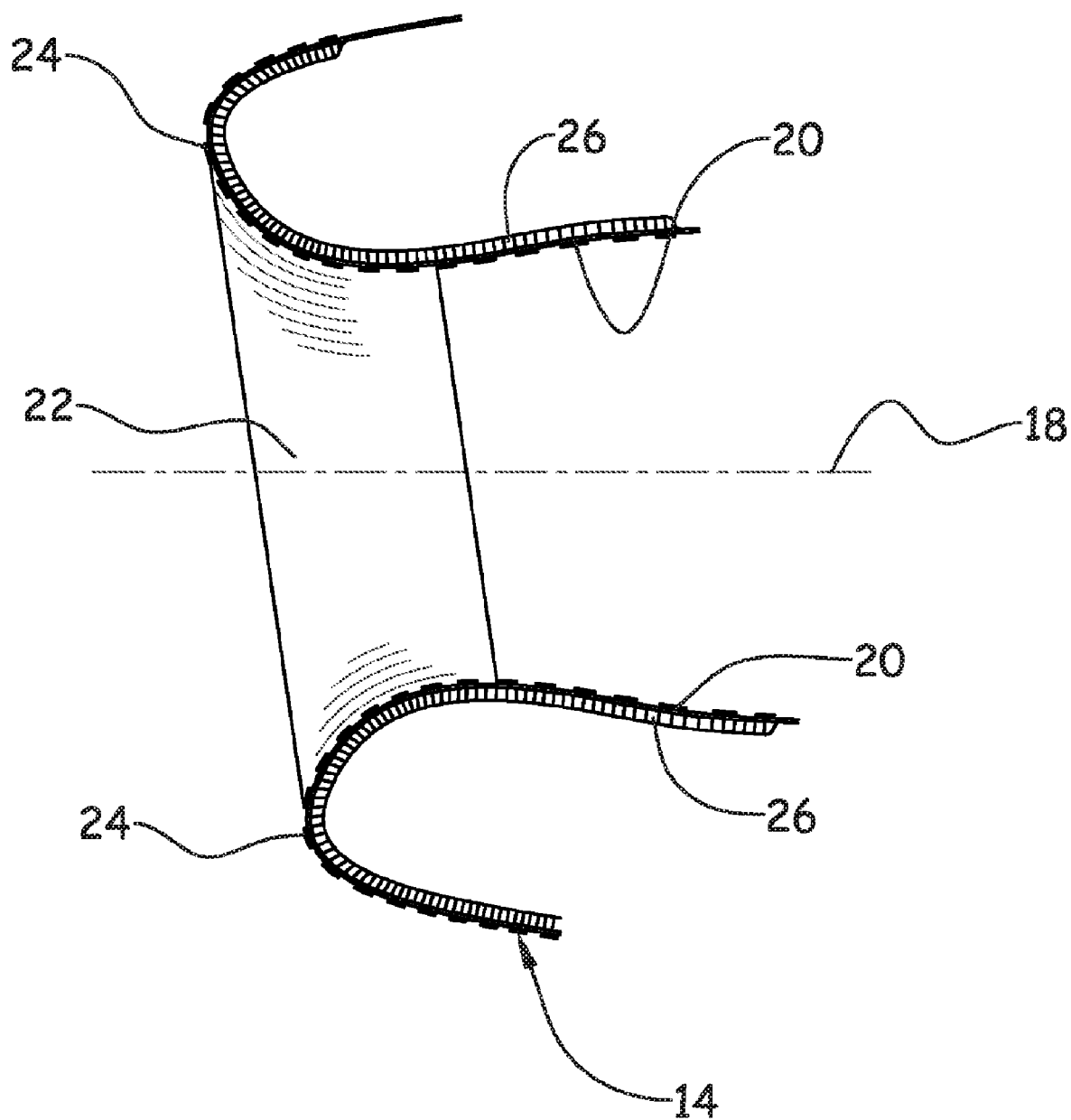
Figure 4A:
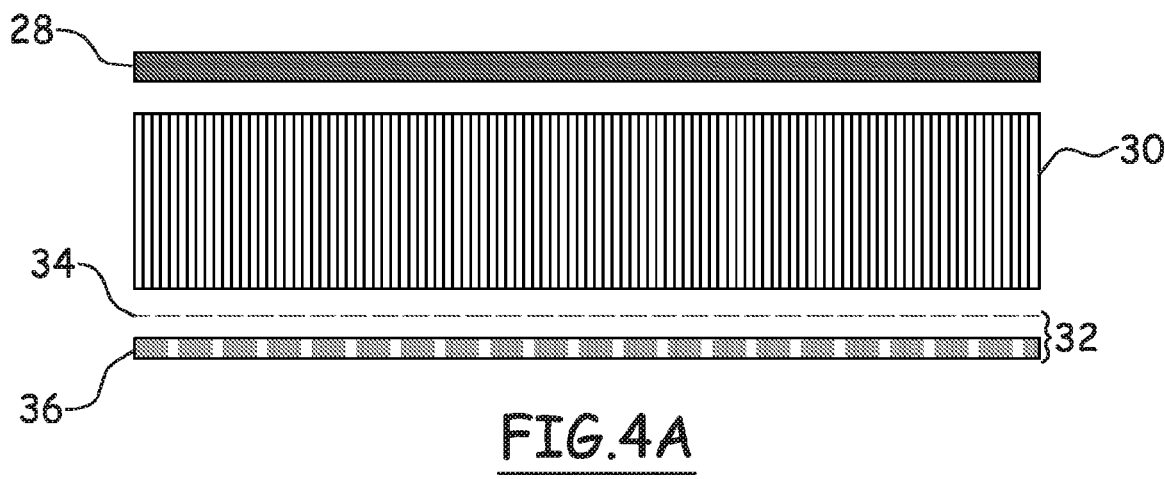
Figure 4B:
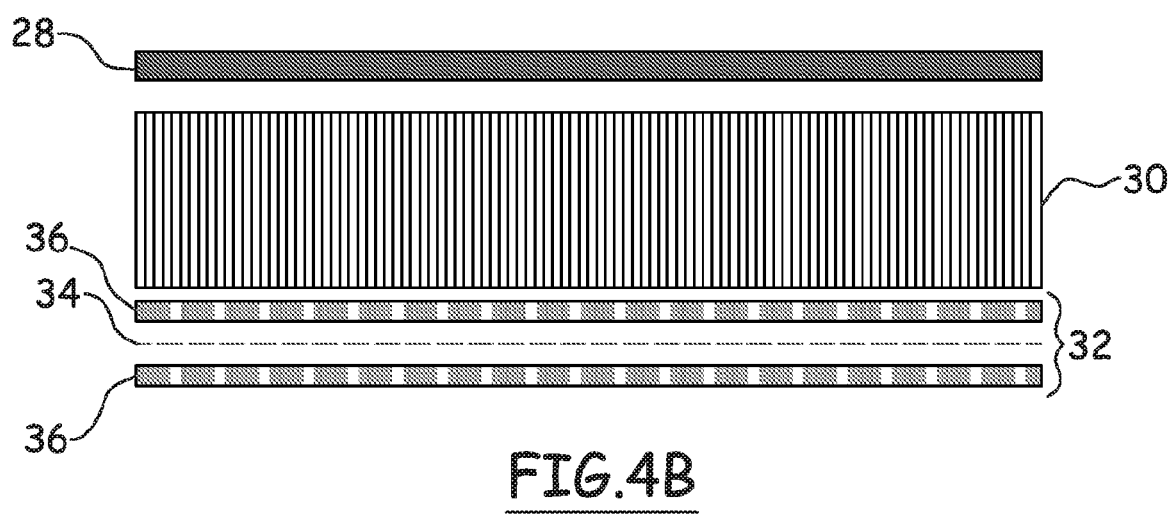
Figure 4C:
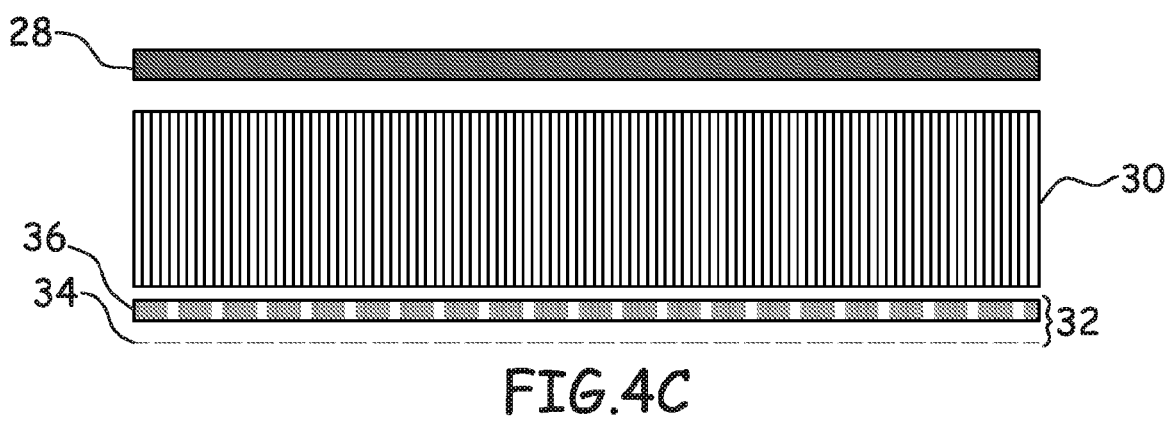
Figure 5A:
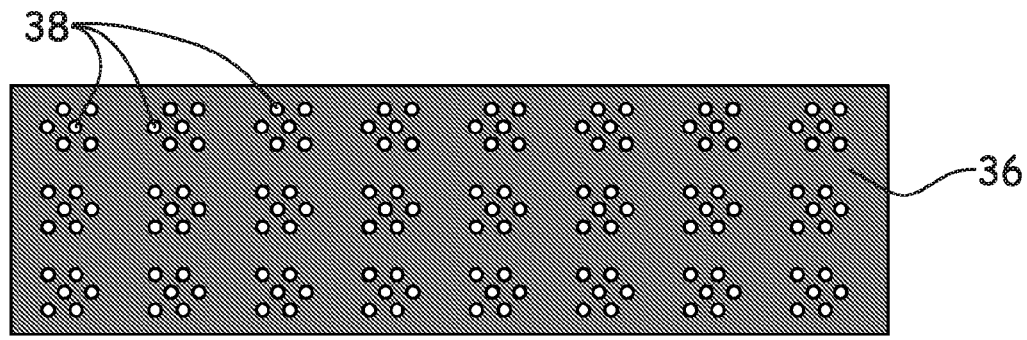
Figure 5B:
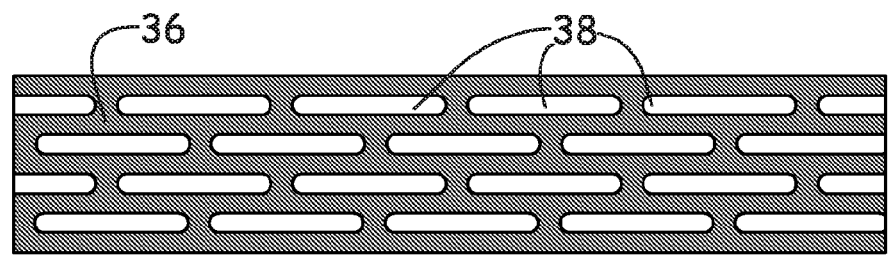
Figure 6A:
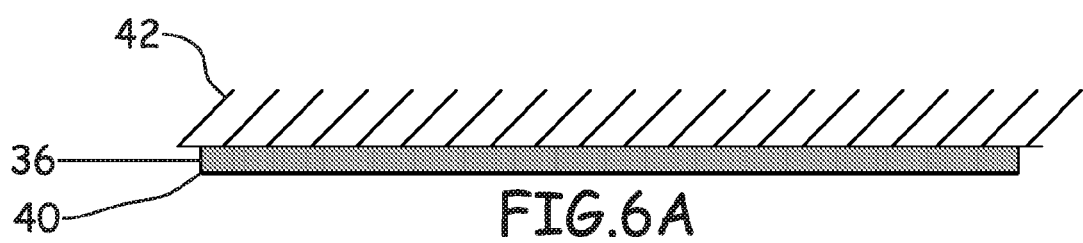
Figure 6B:
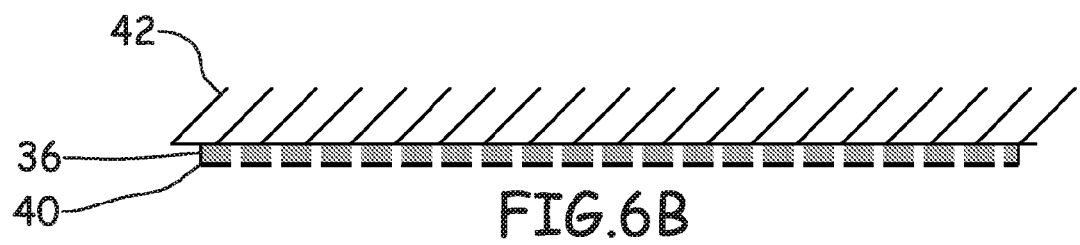
Figure 6C:
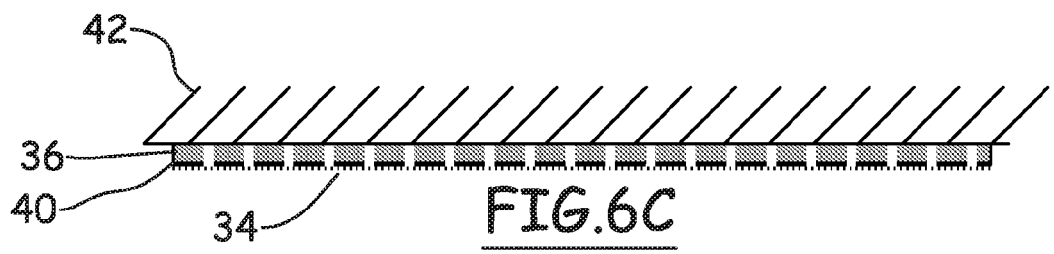

Other characteristics and advantages will emerge from the following description of the invention, a description that is provided only by way of example with regard to the accompanying drawings in which:

FIG. 1 is a perspective view that illustrates a propulsion system of an aircraft, FIG. 2 is a longitudinal cutaway that illustrates the air intake of a nacelle according to a first variant, FIG. 3 is a longitudinal cutaway that illustrates the air intake of a nacelle according to another variant, FIG. 4A is a cutaway that illustrates an acoustic coating according to a first variant, FIG. 4B is a cutaway that illustrates an acoustic coating according to a second variant, FIG. 4C is a cutaway that illustrates an acoustic coating according to a third variant, FIG. 5A is an elevation view of an acoustically resistive layer according to a first configuration of the orifices that are made on the reinforcement structure, FIG. 5B is an elevation view of an acoustically resistive layer according to another configuration of the orifices that are made on the reinforcement structure, and FIGS. 6A to 6C are a block diagram that diagrammatically illustrates different stages of the process for production according to the invention.

DETAILED DESCRIPTION OF THE PREFERRED EMBODIMENTS

This invention is now described applied to an air intake of a propulsion system of an aircraft. However, it can apply at different zones of an aircraft, at the level of which an acoustic treatment is carried out, for example the leading edge of the wings or any other location that is subjected to high temperatures, such as close to the engine or close to the engine blades. For the remainder of the description, frost is defined as both frost and ice, of all natures, all structures and all thicknesses.

FIG. 1 shows a propulsion system 10 of an aircraft that is connected under the wing by means of a mast 12. However, this propulsion system could be connected to other zones of the aircraft.

This propulsion system comprises a nacelle 14 in which a power plant that entrains a fan that is mounted on its shaft 16 is arranged in an essentially concentric manner. The longitudinal axis of the nacelle is referenced 18.

The nacelle 14 comprises an inside wall 20 that delimits a pipe with an air intake 22 at the front, a first portion of the incoming air flow, called primary flow, passing through the power plant to participate in the combustion, the second portion of the air flow, called secondary flow, being entrained by the fan and flowing into an annular pipe that is delimited by the inside wall 20 of the nacelle, and the outside wall of the power plant.

The top part 24 of the air intake 22 describes an essentially circular shape that extends in a plane that can be essentially perpendicular to the longitudinal axis 18, as illustrated in FIG. 2, or not perpendicular, with the top part located just before 12 o'clock, as illustrated in FIG. 3. However, other air intake shapes can be considered.

For the remainder of the description, aerodynamic surface is defined as the shell of the aircraft that is in contact with the aerodynamic flow.

To limit the impact of the sound pollution, a coating 26 whose purpose is to absorb a portion of the sound energy, in particular by using the principle of Helmholtz resonators, is provided in particular at the aerodynamic surfaces. In a known way, this acoustic coating, also called an acoustic panel, comprises—from the inside to the outside—a reflective layer 28, at least one alveolar structure 30, and an acoustically resistive structure 32, as illustrated in FIGS. 4A to 4C.

As a variant, the acoustic coating 26 could comprise several alveolar structures by acoustically resistive structures that are called a septum.

According to the variants, the acoustic coating can extend over the surface of the secondary pipe as well as toward the front and can cover the leading edge or rim of the air intake of the nacelle, as illustrated in FIGS. 2 and 3, as well as a portion of the outside surface.

According to one embodiment, the reflective layer 28 can come in the form of a metal panel or a skin that consists of at least one layer of woven or non-woven fibers that are immersed in a resin matrix.

The alveolar structure 30 can come in the form of a honeycomb that is made of metal or composite material, for example a honeycomb structure that is marketed under the name Nida Nomex. As a variant, the alveolar structure could be obtained by other means, for example by the assembly of bands that are intertwined so as to delimit cells that are open at each of their ends.

The reflective layer 28 and the alveolar structure 30 are not presented in more detail because they are known to one skilled in the art.

An acoustically resistive layer 32 comprises at least one porous structure that has a dissipative role, partially transforming the acoustic energy of the sound wave that passes through it into heat.

According to one embodiment, the acoustically resistive structure 32 comprises at least one porous layer 34 and at least one reinforcement layer 36 that imparts to the acoustically resistive structure the required mechanical characteristics.

According to a first variant that is illustrated in FIG. 4A, the acoustically resistive structure 32 can comprise a porous layer 34 that is inserted between the alveolar structure and a reinforcement structure 36.

According to a second variant that is illustrated in FIG. 4B, the acoustically resistive structure 32 can comprise a porous layer 34 that is inserted between two reinforcement structures 36.

According to another variant that is illustrated in FIG. 4C, the acoustically resistive structure 32 can comprise a reinforcement structure 36 that is inserted between the alveolar structure 30 and a porous layer 34.

The porous layer 34 comes in the form of a metal material such as, for example, a wire mesh. According to one embodiment, the acoustic damping material is metal, in particular a stainless steel mesh that is known to one skilled in the art.

The reinforcement structure 36 comes in the form of a metal plate that comprises openings 38 or micro-perforations that ensure the passage of acoustic waves through said reinforcing structure. As appropriate, the reinforcement structure can be made of an aluminum alloy or a titanium alloy. Titanium alloys are advantageous due to their high strength/weight ratio, their low expansion coefficient, and their strength at high temperatures. Thus, the acoustically resistive structure can withstand high temperatures on the order of 380° C. by using a reinforcement structure that is made of titanium alloy and an adhesive that can withstand said temperatures.

The reinforcement structure 36 comprises openings 38 or micro-perforations of different shapes or dimensions, for example circular holes that are grouped as illustrated in FIG. 5A or oblong shapes as illustrated in FIG. 5B. The shapes and sizes of the openings 38 are determined so as to reduce disruptions to the air flows, to ensure the required mechanical strength, in particular so as to withstand delamination, and to allow the passage of sound waves to impart a good yield to the acoustic coating.

In all of the cases, the acoustically resistive structure 32 comprises so-called open zones that can allow acoustic waves to pass and other so-called closed or filled zones that do not allow sound waves to pass but are designed to ensure the mechanical strength of said layer. This acoustically resistive layer is characterized in particular by an open surface ratio that varies essentially based on the engine and components that constitute said layer.

Prior to the assembly with the porous layer, the reinforcement structure undergoes one or more surface treatments that have at least one of the following objectives:
  Eliminating the debris, pollution, oils and lubricants, in particular from lamination and elongation;
  Eliminating the adsorbed layers;
  Eliminating the more or less fragile layers (natural oxides, hydrated oxides) until a bare metal that is perfectly clean is reached;
  Increasing the wettability;
  Increasing surface roughness to improve mechanical bonding;
  Creating a reactive oxide layer on the surface or any other solid layer to increase the adhesion of the adhesive.

According to one embodiment, the reinforcement structure undergoes sandblasting after degreasing. Preferably, very fine turnings are used to obtain a microstructure.

According to the invention, to assemble the reinforcement structure and the porous layer, an amorphous adhesive is used.

Adhesive is defined as a chemical product that makes it possible to assemble at least two elements.

The amorphous property of the adhesive makes it possible to be able to rise in temperature and to cool down again, without modifying its chemical structure and therefore its structural characteristics. This characteristic makes possible gluing in stages, so as to verify the quality of the gluing. During temperature variations, a physical aging or structural relaxation, a reversible phenomenon that is part of the amorphous nature of the adhesive, is achieved in contrast to chemical aging that induces an irreversible change in the bridges between chains or breaking of bonds.

Thus, because the adhesive is not altered by increases in temperature and successive cooling stages, it is possible to carry out the assembly operation step by step so as to measure the quality of the gluing as the process proceeds. In addition, it is possible to proceed piece by piece using the amorphous property of the adhesive for the zones of a shape previously difficult to glue, such as, for example the leading edge of an air intake.

According to another characteristic of the invention, the adhesive is of the iron-on type. Preferably, it comes in the form of a film 40 with a constant thickness, not adhesive under cold conditions, which is reactive to heat, whereby said film is applied to one of the surfaces to be glued.

According to the invention, the perforations or micro-perforations made in the reinforcement structure 36 are made once the gluing with the amorphous glue is done. Thus, a thickness of glue that is constant and minimal over the entire surface of the reinforcement structure, which ensures a better assembly quality, is achieved.

Further, this solution makes it possible to prevent the flowing of the adhesive in the direction of the open zones and the sealing of meshes in these zones so as not to alter the acoustic characteristics of the acoustically resistive structure.

According to one embodiment, an adhesive film 40 is applied to the reinforcement structure 36 as illustrated in FIG. 6A. Advantageously, the reinforcement structure and the adhesive film are arranged in a mold 42 that is subjected to pressing.

The unit is then placed in a furnace or autoclave of large dimensions that allows a temperature elevation of 100 to 300° C. so as to activate the adhesive, under a pressure of 1 to 15 bar. The amorphous adhesive 40 hardens during cooling without losing its mechanical and adhesive characteristics.

The reinforcement structure 36 is thus integrally wetted. It achieves a constant and optimal adhesive thickness unlike in the prior art, which makes it possible to improve the assembly qualities.

Next, perforations or micro-perforations are then made as illustrated in FIG. 6B. During this stage, it is noted that the reinforcement structure and the adhesive film are perforated simultaneously so that the openings of the adhesive film and the reinforcement structure coincide perfectly. The implementation is thus greatly simplified.

Different techniques can be implemented to produce perforations or micro-perforations. By way of example, it is possible to use a laser beam or an electron beam. The possible heating produced during machining does not alter the adhesive to the extent that the adhesive that is used is amorphous. The adhesive not being altered at the peripheries of the open zones, a significant adhesive power is obtained in these zones that are greatly stressed.

As illustrated in FIG. 6C, the porous layer 34 is then applied to the adhesive 40, flattened by means of a mold or the like. The unit is then placed in a large furnace or autoclave, which makes possible a temperature elevation of 100 to 300° C. so as to activate the adhesive, under a pressure of 1 to 15 bar. Optionally, the deposition of the porous layer can be done piece by piece, whereby the adhesive is activated for each porous layer piece as the process proceeds. This solution makes it possible to produce gluing of satisfactory quality even in the zones of complex shapes, such as the leading edge of an air intake, which are generally the most stressed zones.

The amorphous nature of the adhesive allows a succession of temperature increases and cooling periods that does not alter the characteristics of said adhesive, which makes possible a step-by-step assembly, limits the risks of blocking meshes of the porous layer facing the open zones of the reinforcement structure, and guarantees a constant and optimal thickness of the adhesive.

The invention claimed is:

1. A process for the production of an acoustically resistive structure that can be inserted in an alveolar structure to obtain a coating for acoustic treatment, said acoustically resistive structure (32) including at least one porous layer (34) and at least one reinforcement structure (36) assembled by gluing, the process comprising the steps of:
    applying an amorphous-type adhesive on said at least one reinforcement structure (36);
    perforating or micro-perforating the reinforcement structure (36) after the application of the amorphous-type adhesive; and
    applying said at least one porous layer against a face of the reinforcement structure (36) that is coated with the amorphous-type adhesive,
    wherein, at peripheries of open zones of the acoustically resistive structure, said adhesive is not altered by a heating produced during the perforating step.

2. The process according to claim 1, wherein the application of the porous layer (34) is carried out as a deposition piece by piece, whereby the amorphous-type adhesive is activated for each piece of the porous layer as the application of the porous layer proceeds.

3. The process according to claim 1, wherein a thermostable adhesive is used.

4. The process according to claim 1, wherein an amorphous-type adhesive film that is not adhesive under cold conditions is used.

5. The process according to claim 1, further comprising the steps of:
    arranging the reinforcement structure (36) and the film (40) on a mold (42) to form a unit, and subjecting the unit to a rise in temperature of 100° C. to 300° C. so as to activate the adhesive, under a pressure of 1 to 15 bar; and
    arranging the porous layer (34) and subjecting the unit to a temperature elevation of 100° C. to 300° C. so as to activate the adhesive, under a pressure of 1 to 15 bar,
    wherein the producing perforations or micro-perforations step is performed, after a cooling, upon the reinforcement structure and the adhesive layer.

6. An acoustically resistive structure insertable into an alveolar structure so as to obtain a coating for an acoustic treatment, whereby said acoustically resistive structure (32) comprises at least one porous layer (34) and at least one reinforcement structure (36) that are assembled with an amorphous-type adhesive from the process according to claim 1.

7. A coating for the acoustic treatment that comprises, from an inside to an outside:
    a reflective layer (28);
    at least one alveolar structure (30); and
    an acoustically resistive structure (32),
    wherein said acoustically resistive structure (32) comprises at least one porous layer (34) and at least one reinforcement structure (36) that are assembled with an amorphous-type adhesive from the process according to claim 1.

8. A nacelle comprising:
    a coating for an acoustic treatment that comprises, from the inside to the outside, a reflective layer (28), at least one alveolar structure (30), and an acoustically resistive structure (32),
    wherein said acoustically resistive structure (32) comprises at least one porous layer (34) and at least one reinforcement structure (36) that are assembled with an amorphous-type adhesive from the process according to claim 1.

9. The process according to claim 2, wherein a thermostable adhesive is used.

10. The process according to claim 2, wherein an amorphous-type adhesive film that is not adhesive under cold conditions is used.

11. The process according to claim 2, further comprising the steps of:
    arranging the reinforcement structure (36) and the film (40) on a mold (42) to form a unit, and subjecting the unit to a rise in temperature of 100° C. to 300° C. so as to activate the adhesive, under a pressure of 1 to 15 bar; and
    arranging the porous layer (34) and subjecting the unit to a temperature elevation of 100° C. to 300° C. so as to activate the adhesive, under a pressure of 1 to 15 bar,
    wherein the producing perforations or micro-perforations step is performed, after a cooling, upon the reinforcement structure and the adhesive layer.

12. The process according to claim 3, further comprising the steps of:
    arranging the reinforcement structure (36) and the film (40) on a mold (42) to form a unit, and subjecting the unit to a rise in temperature of 100° C. to 300° C. so as to activate the adhesive, under a pressure of 1 to 15 bar; and
    arranging the porous layer (34) and subjecting the unit to a temperature elevation of 100° C. to 300° C. so as to activate the adhesive, under a pressure of 1 to 15 bar,
    wherein the producing perforations or micro-perforations step is performed, after a cooling, upon the reinforcement structure and the adhesive layer.

13. The process according to claim 4, further comprising the steps of:
    arranging the reinforcement structure (36) and the film (40) on a mold (42) to form a unit, and subjecting the unit to a rise in temperature of 100° C. to 300° C. so as to activate the adhesive, under a pressure of 1 to 15 bar; and
    arranging the porous layer (34) and subjecting the unit to a temperature elevation of 100° C. to 300° C. so as to activate the adhesive, under a pressure of 1 to 15 bar,
    wherein the producing perforations or micro-perforations step is performed, after a cooling, upon the reinforcement structure and the adhesive layer.

* * * * *